United States Patent
Chang et al.

(10) Patent No.: US 7,953,963 B2
(45) Date of Patent: May 31, 2011

(54) SYSTEM AND METHOD FOR AUTOMATICALLY LOADING SOFTWARE COMPONENTS

(75) Inventors: Yu-Chen Chang, Taipei Hsien (TW); Ming-Yi Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 905 days.

(21) Appl. No.: 11/861,304

(22) Filed: Sep. 26, 2007

(65) Prior Publication Data
US 2008/0189699 A1    Aug. 7, 2008

(30) Foreign Application Priority Data
Feb. 2, 2007 (CN) .......................... 2007 1 0200153

(51) Int. Cl.
*G06F 9/00* (2006.01)
*G06F 9/24* (2006.01)
*G06F 15/177* (2006.01)
(52) U.S. Cl. .................... 713/1; 713/2; 713/100; 726/26
(58) Field of Classification Search .................... 713/1, 2, 713/100; 726/26
See application file for complete search history.

(56) References Cited

U.S. PATENT DOCUMENTS

| | | | | |
|---|---|---|---|---|
| 6,122,732 | A * | 9/2000 | Ahuja ................................. | 713/1 |
| 7,447,892 | B2 * | 11/2008 | Shih ................................... | 713/1 |
| 7,490,245 | B2 * | 2/2009 | Waltermann et al. ........... | 713/189 |
| 7,551,302 | B2 * | 6/2009 | Oki et al. ....................... | 358/1.15 |
| 7,562,210 | B2 * | 7/2009 | Zhang et al. ....................... | 713/2 |
| 7,694,125 | B2 * | 4/2010 | Nijhawan et al. .............. | 713/100 |
| 7,694,280 | B2 * | 4/2010 | James et al. .................... | 717/127 |
| 7,809,583 | B2 * | 10/2010 | Rusman et al. ................. | 705/1.1 |
| 2001/0014907 | A1 * | 8/2001 | Brebner ......................... | 709/202 |
| 2002/0013807 | A1 * | 1/2002 | Richard ......................... | 709/202 |
| 2002/0116549 | A1 * | 8/2002 | Raffaele et al. ................ | 709/330 |
| 2004/0225875 | A1 * | 11/2004 | Huang et al. ....................... | 713/1 |
| 2005/0216909 | A1 * | 9/2005 | James et al. .................... | 717/174 |
| 2006/0020810 | A1 * | 1/2006 | Waltermann et al. .......... | 713/179 |
| 2006/0020821 | A1 * | 1/2006 | Waltermann et al. .......... | 713/189 |
| 2006/0288422 | A1 * | 12/2006 | Liu et al. .......................... | 726/26 |
| 2007/0088942 | A1 * | 4/2007 | Zhang et al. ....................... | 713/1 |
| 2007/0123242 | A1 * | 5/2007 | Shapiro et al. ................. | 455/418 |
| 2007/0150294 | A1 * | 6/2007 | Rusman et al. .................... | 705/1 |
| 2007/0214346 | A1 * | 9/2007 | Shih ................................. | 713/1 |
| 2007/0234348 | A1 * | 10/2007 | Kelso et al. .................... | 717/174 |
| 2008/0133901 | A1 * | 6/2008 | Nijhawan et al. .................. | 713/2 |

* cited by examiner

*Primary Examiner* — Thomas Lee
*Assistant Examiner* — Jaweed A Abbaszadeh
(74) *Attorney, Agent, or Firm* — Frank R. Niranjan

(57) ABSTRACT

A computer-based method for automatically loading software components is disclosed. The method includes the steps of: powering on a computer, identifying whether there is an identifier recorded in a desktop management interface (DMI) in a BIOS of the computer, and detecting that the computer is installed with a non-Windows based operating system if the DMI includes an identifier, and that the computer is installed with a Windows based operating system if there is no identifier recorded in the DMI; loading specified application software to the computer if the computer is installed with the Windows based operating system. A related system is also disclosed.

2 Claims, 3 Drawing Sheets

SYSTEM AND METHOD FOR AUTOMATICALLY LOADING SOFTWARE COMPONENTS

BACKGROUND OF THE INVENTION

1. Field of the Invention

The present invention is related to a system and method for automatically loading software components.

2. Description of Related Art

System Locked Preinstallation, often abbreviated as SLP, is a procedure used by major computer manufacturers in order to preactivate Microsoft's operating systems such as Windows XP and Windows Server 2003 before mass distribution. Operating systems that use SLP check for a particular text string in a computer's BIOS upon booting. If the text string does not match the information stored in the particular installation's OEM (Original Equipment Manufacture) BIOS files, the user is prompted to activate his or her copy as normal. This effectively "locks" the operating system to the qualified motherboard. In addition, if an end user feels the need to perform a "clean install" of Windows, and if the manufacturer supplies the user with an installation disc (not a "System Recovery" disc that is a hard drive image), the user will not be prompted to activate the copy, given that the installation is performed on the same motherboard. Furthermore, because the check only involves the BIOS and not hardware, a user is allowed to change virtually all hardware components within the machine, a procedure that would normally trigger reactivation in retail XP/Server 2003 copies.

To prevent software piracy of Windows based operation system, it is a need to load the SLP software on a specified computer.

Therefore, what is needed is a system and method for automatically loading software components which can load a SLP 2.0 procedure to a computer installed a Windows based operating system.

SUMMARY OF THE INVENTION

A system for automatically loading software components is provided in accordance with a preferred embodiment. The system is installed in a BIOS of a computer. The system includes an identifying and judging module, and a loading module. The identifying and judging module is configured for identifying whether there is an identifier recorded in a desktop management interface (DMI) in the BIOS, and detecting that the computer is installed with a non-Windows based operating system if the DMI includes an identifier, and that the computer is installed with a Windows based operating system if there is no identifier recorded in the DMI. The loading module is configured for loading specified application software to the computer if the computer is installed with the Windows based operating system.

A computer-based method for automatically loading software components is also provided. The method includes the steps of: powering on a computer, identifying whether there is an identifier recorded in a desktop management interface (DMI) in a BIOS of the computer, and detecting that the computer is installed with a non-Windows based operating system if the DMI includes an identifier, and that the computer is installed with a Windows based operating system if there is no identifier recorded in the DMI; loading specified application software to the computer if the computer is installed with the Windows based operating system.

Other systems, methods, features, and advantages of the present invention will be or become apparent to one with skill in the art upon examination of the following drawings and detailed description.

DETAILED DESCRIPTION OF THE INVENTION

Figure 1:
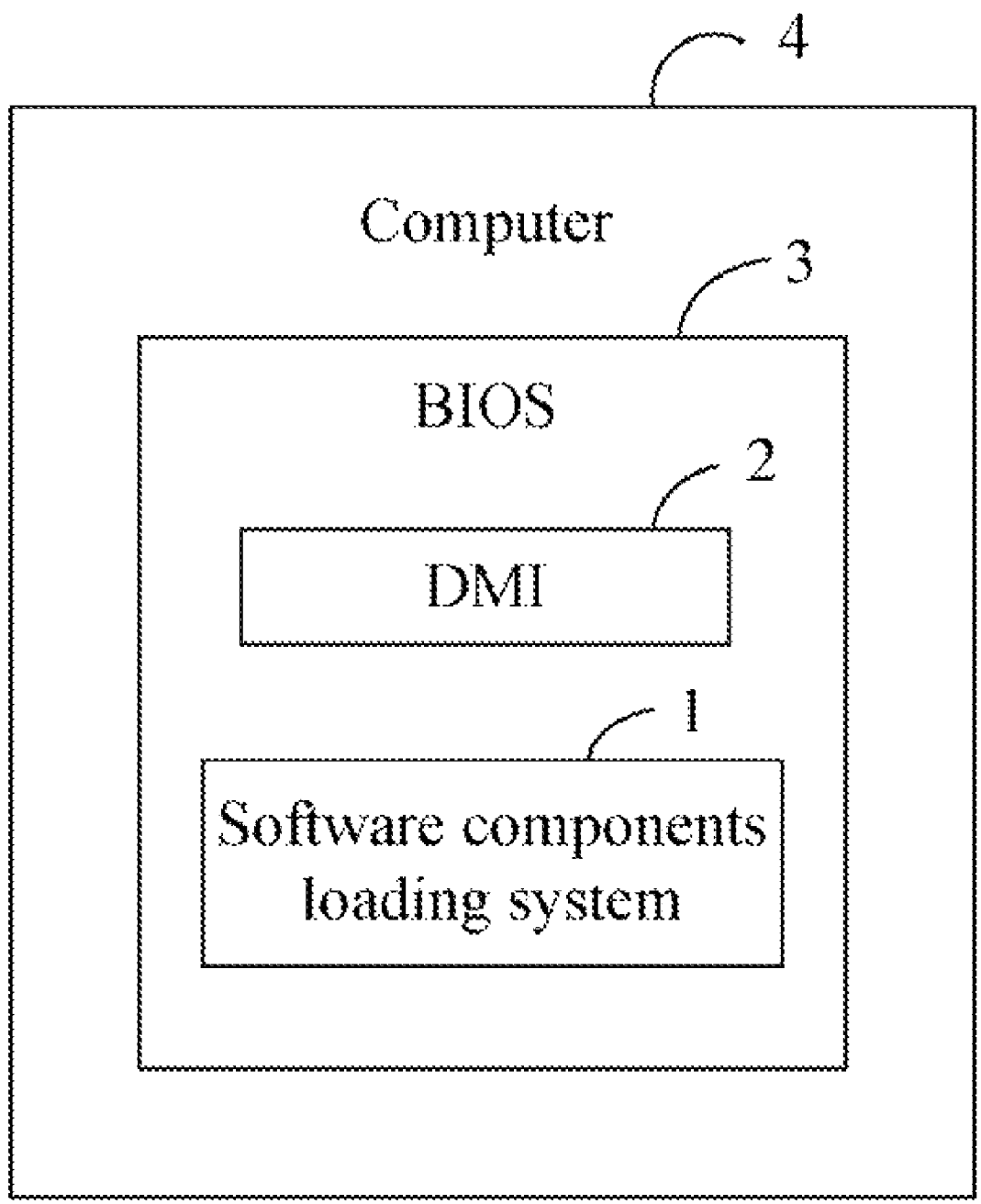
FIG. 1 is a schematic diagram of hardware configuration of a system for automatically loading software components in accordance with a preferred embodiment.

FIG. 1 is a schematic diagram of hardware configuration of a system for automatically loading software components (hereinafter, "the software components loading system 1") in accordance with a preferred embodiment. The software components loading system 1 is stored in a BIOS 3 of a computer 4. The BIOS 3 further includes a desktop management interface (DMI) 2. The DMI 2 is configured for recording an identifier when the computer 4 is installed with a non-Windows based operating system. Before the computer 4 is sent to a customer, if a non-Windows based operating system (such as a Linux operating system) is installed in the computer 4 during the system installation stage, an identifier is recorded in the DMI 2 in the BIOS 3. Otherwise, if the computer 4 is installed with a Windows based operating system during the system installation stage, the DMI 2 will not record any identifier.

Figure 2:
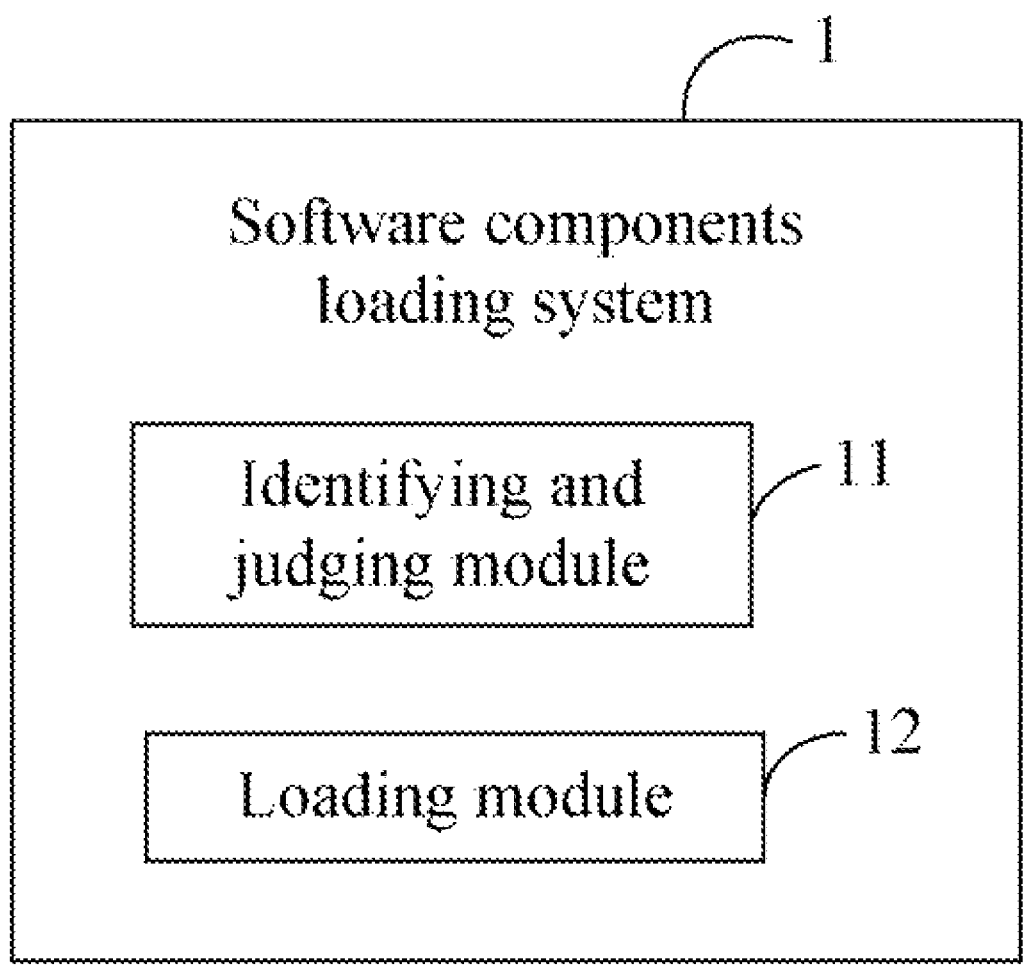
FIG. 2 is a schematic diagram showing function modules of a software components loading system of FIG. 1.

FIG. 2 is a schematic diagram showing function modules of the software components loading system 1. The software components loading system 1 may include an identifying and judging module 11 and a loading module 12.

The identifying and judging module 11 is configured for identifying whether there is an identifier recorded in the DMI 2 in the BIOS 3. If the DMI 2 includes an identifier, the identifying and judging module 11 detects that the computer 4 is installed with a non-Windows based operating system. Otherwise, if there is no identifier recorded in the DMI 2, the identifying and judging module 11 detects that the computer 4 is installed with a Windows based operating system developed by Microsoft Corporation and needs to be loaded with specified application software, wherein the application software may be a System Locked Preinstallation (SLP) 2.0.

The loading module 12 is configured for loading the SLP 2.0 procedure to the computer 4 if the computer 4 is installed with the Windows based operating system.

Figure 3:
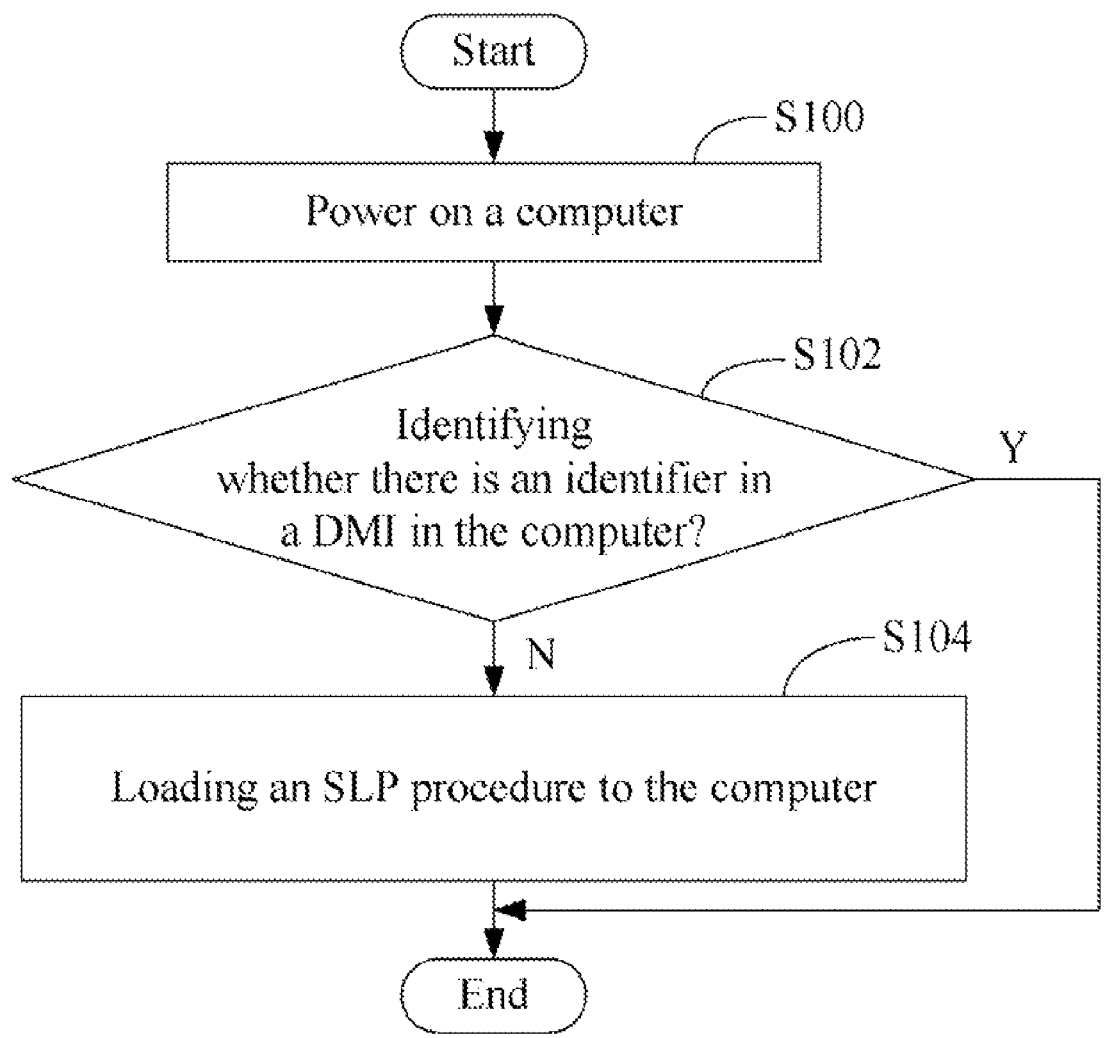
FIG. 3 is a flowchart of a preferred method for automatically loading software components in accordance with one embodiment.

FIG. 3 is a flowchart of a preferred method for automatically loading software components in accordance with one embodiment. In step S100, a user powers on the computer 4 during the system installation stage. The DMI 2 in the BIOS 3 will record an identifier if the computer 4 is installed with a non-Windows based operating system (such as a Linux operating system) during the system installation stage. Otherwise, if the computer 4 is installed with a Windows based operating system during the system installation stage, the DMI 2 will not record any identifier.

In step S102, the identifying and judging module 11 identifies whether there is an identifier recorded in the DMI 2 in the BIOS 3 of the computer 4. If the DMI 2 includes an identifier, the identifying and judging module 11 detects that the computer 4 is installed with a non-Windows based operating system. Otherwise, if there is no identifier recorded in the DMI 2, the identifying and judging module 11 detects that the computer 4 is installed with a Windows based operating system developed by Microsoft Corporation and needs to be loaded with specified application software, wherein the application software may be a System Locked Preinstallation (SLP) 2.0.

In step S104, the loading module 12 loads the SLP 2.0 procedure to the computer 4 if the computer 4 is installed with the Windows based operating system.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for automatically loading software components, the system being installed in a BIOS of a computer, the system comprising:

an identifying and judging module configured for identifying whether there is an identifier recorded in a desktop management interface (DMI) in the BIOS, and detecting that the computer is not installed with a specified operating system if the DMI includes an identifier, and that the computer is installed with the specified operating system if there is no identifier recorded in the DMI; and a loading module configured for loading specified application software to the computer if the computer is installed with the specified operating system, wherein the application software is a System Locked Preinstallation (SLP) 2.0.

2. A computer-based method for automatically loading software components, the method comprising:

powering on a computer, identifying whether there is an identifier recorded in a desktop management interface (DMI) in a BIOS of the computer, and detecting that the computer is not installed with a specified operating system if the DMI includes an identifier, and that the computer is installed with the specified operating system if there is no identifier recorded in the DMI; and loading specified application software to the computer if the computer is installed with the specified operating system, wherein the application software is a System Locked Preinstallation (SLP) 2.0.

* * * * *